Feb. 19, 1935.  J. J. DRABIN  1,991,604
BATTERY FILLER
Original Filed Feb. 5, 1934
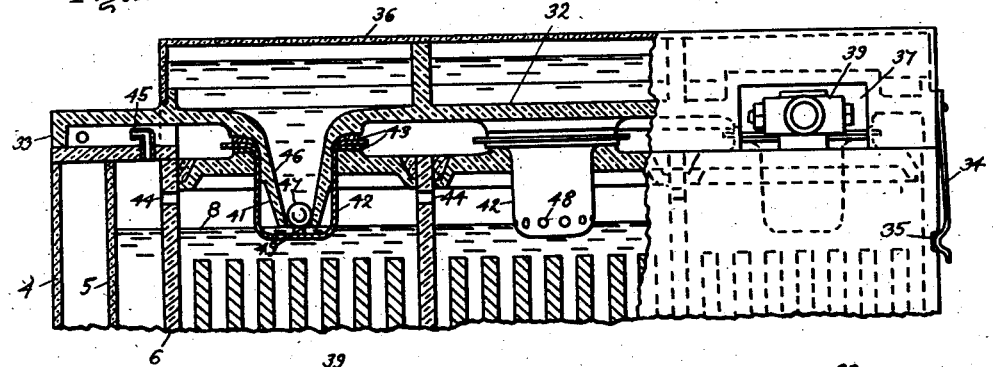
John J. Drabin
INVENTOR
BY John P. Nixonor
ATTORNEY Patented Feb. 19, 1935

1,991,604

UNITED STATES PATENT OFFICE 1,991,604

BATTERY FILLER

John J. Drabin, New York, N. Y.

Original application February 5, 1934, Serial No. 709,757. Divided and this application April 26, 1934, Serial No. 722,648

2 Claims. (Cl. 137—68)

My invention relates to battery fillers and has particular reference to automatic fillers supported on the top of a storage battery.

This is a divisional application of my application Serial No. 709,757 filed Feb. 5, 1934, Patent No. 1,988,192, Jan. 15, 1935.

The object of my invention is to provide an automatic device containing water and adapted to maintain a constant level of the electrolyte in a battery. Another object of my invention is to provide a device for indicating whether there is sufficient amount of electrolyte in the battery.

My device is especially adapted for automobile batteries provided with inspection holes closed with plugs.

In ordinary batteries the plugs must be removed in order to inspect the battery and to refill the same. This procedure is rather difficult as the floor boards must be removed in order to gain access to the battery, the latter being placed near the transmission surrounded with dirty and greasy objects. In spite of this difficulty, the battery must be inspected quite frequently as it may be seriously damaged if permitted to remain partly dry.

In order to facilitate the inspection and refilling, I provide special hollow plugs containing water and adapted to release this water automatically when the level of the electrolyte drops below the normal level. I provide these plugs with valves adapted to close the outlets when the plugs are removed or replaced. I also provide means to open these valves when the plugs are placed in the operative positions on the battery. I further provide these plugs with transparent tops through which the liquid can be seen, so that the plugs can be removed and refilled when they become empty.

My invention is more fully described in the accompanying specification and drawing in which—

Fig. 1 is an elevation partly in section of my refilling well supported on top of a battery, Fig. 2 is a plan view of the same, Fig. 3 is a transverse section of the same, Fig. 4 is a sectional elevation of a modified device and, Fig. 5 is a detail view of a valve releasing shell.

My battery filler consists of a flat chamber 32 formed as a cover for a battery 6 on which it rests with the edges 33 being clamped in the operative position by spring hooks 34 engaging notches 35 in the side walls of the battery. The cover 36 of the chamber 32 is made of a transparent material such as celluloid and is cemented to the walls of the chamber so as to render it air-tight. The chamber 32 is provided with recesses 37 and 38 for the battery terminal 39 and connectors 40. The bottom of the chamber has hollow tapering plugs 41 fitting into flanged cup-shaped shells 42. The latter are fitted into filling apertures in the cover 15 of the battery and are provided with rubber sealing gaskets 43 above and below the flanges of the shells. The joints between the plugs and the battery cover 15 are made thereby air-tight. Ventilation is provided by holes 44 in the partitions of the battery and by a vent tube 45 in the cover above the chamber 5. The plugs 41 have outwardly converging openings 46 with balls 47 closing the lower ends of the plugs, the balls 47 acting as valves. The chamber 32 is filled with pure water while in an inverted position through the holes 46.

The cover is then quickly turned over, the balls 47 dropping into the narrow ends of the holes 46 and closing them. The covering chamber 32 is then placed over the battery and held in the operative position by the spring latches 34 with the plugs 41 tightly fitting in the apertures in the cover. The ends of the plugs in this position reach the level of the electrolyte 8, the latter passing into the shells 42 through holes 48. Lugs 49 are provided in the bottom portions of the shells. The balls 47 rest on these lugs being thereby raised and opening the passage to the water from the chamber 32 into the battery. The water will flow until the level of the electrolyte rises above the lower ends of the plugs 41 thereby closing them and stopping the further flow of water. The shells 42 remain in this position in the cover when the chamber 32 is being removed or replaced.

With this arrangement of the plugs and shells it is not necessary to have the edges of the filling apertures threaded as is the case when screw plugs are used. The presence of such threads does not interfere, however, with the use of the straight shells and plugs as they can be pressed in over the threads.

A modified arrangement is shown in Fig. 4 especially adapted for standard batteries with threaded filling holes. A threaded shell 50 is fitted into the hole being screwed into it by a handle or lug 51. The plug 52, individual for each hole, is then screwed in, the ball 17 being raised by the lug 49 on the bottom of the shell. The plug has a transparent cap 53 and is filled with pure water 54.

The shells 42 or 50 can be made of celluloid or similar material unaffected by the acid of the battery.

A slot 55 is made in the filling hole for the air. No gaskets are required for the plug with this construction.

The vent hole or groove 55' may be provided in the side of the plug as shown in Fig. 4. The cap-shaped shell 42 or 50 serves as a baffle for preventing the electrolyte from splashing through the slot 55'. In such case the vent 55 may be dispensed with.

The plug must be turned over for placing it in its operative position, and a certain amount of water will be spilled during this operation, leaving an air space above the water level in the plug. This air space will permit the free expansion of water when it freezes in winter.

Due to the comparatively small amount of water in the plug, it will quickly melt when the engine is running because of the heat radiated from the engine and from the exhaust pipe.

The freezing will be retarded, however, due to a certain amount of diffusion taking place between the water in the plug and the electrolyte, introducing acid into the water in the plug and lowering its freezing point.

The amount of the reserve water in the plug can be readily observed through the transparent covers 36 or 53. The plugs need not be removed for such an inspection. Due to the construction of my cups 51, my plugs may be made but slightly higher than ordinary plugs, and this is important in view of the limited space available above the top of the battery in an ordinary automobile.

Important advantages of my battery filler are that it is entirely automatic adapted to maintain the constant level of the electrolyte in a battery as long as there is any water (or electrolyte) in the well of the filler-plug; also that the filler can be inspected without removing it from the battery and the amount of water still contained in the filler well can be thereby ascertained; it is simple in construction and can be easily fitted to the existing batteries without any changes in their construction (or with but small changes as may be required for a modification shown in Fig. 6); due to the special construction of the celluloid shells 42 the fillers (plugs) can be made sufficiently low to suit the available space above the battery in the automobiles. These shells are also useful in breaking up any splashes of the electrolyte when the vehicle is in motion. The liquid passes through the shells only because of small holes 48 which prevent any rapid movement of the liquid and its penetration to the outside through the vent holes 55'.

The plugs can be easily filled with water by removing them and turning upside down. The balls 47 then roll away from the tubular extensions 41 through which water can be poured in. By turning the plug over after it has been filled, the ball is made to roll back and to close the end of the extension thereby preventing the loss of water when the plug is inserted in its place.

I claim as my invention:

1. In a battery filler, the combination with a hollow plug adapted to be fitted into a filler hole in the cover of said battery, the lower end of said plug being adapted to reach the normal level of the electrolyte of said battery, said lower end being provided with a tapering aperture extending to the walls of said plug, a ball adapted to close said tapering aperture by gravity when said plug is in its operative position, a thin shell adapted to be inserted between said plug and the sides of said filler hole, said shell adapted to be extended below the level of said electrolyte and being provided with apertures for said electrolyte, and a lug in said shell adapted to raise said ball when said plug is placed in its operative position.

2. In a battery filler, the combination with a hollow tapering plug adapted to be fitted into a filler hole in the cover of said battery, the lower end of said plug being adapted to reach the level of the electrolyte, said plug having a tapering shape inside, a transparent cover over said plug, a ball in said plug adapted to close the aperture in said plug by gravity, a thin shell adapted to be interposed between said plug and the sides of said hole, said plug having a vent groove passing through the contact surface with said shell, said shell adapted to be extended below the level of said electrolyte and being provided with apertures for said electrolyte, a lug in said shell adapted to raise said ball when said plug is in its operative position, and an extension on the outer portion of said shell for holding said shell when said plug is being fitted into said filler hole.

JOHN J. DRABIN.